Sept. 25, 1962 B. D. CAULKINS 3,055,410
TIRES
Filed Jan. 29, 1960 2 Sheets-Sheet 1
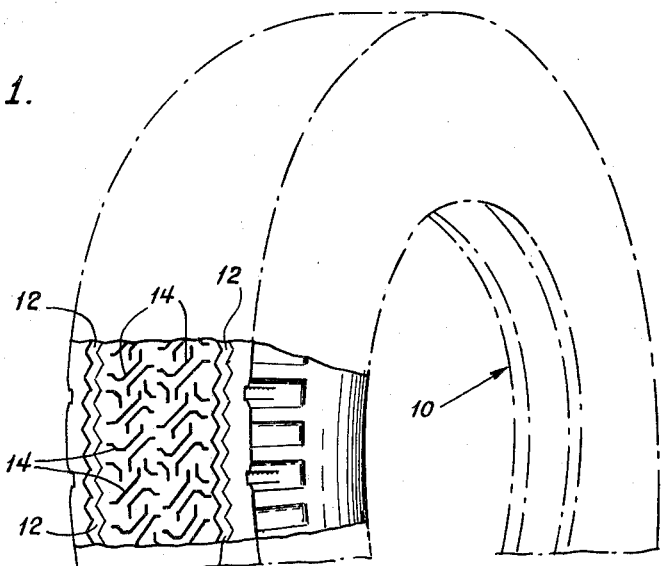
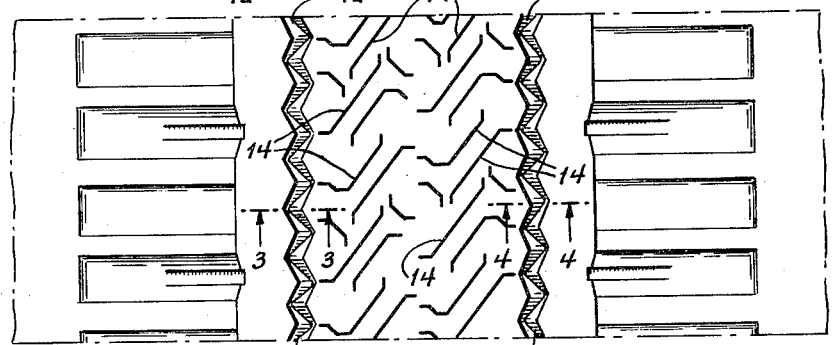
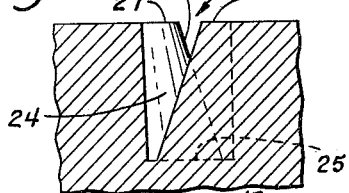 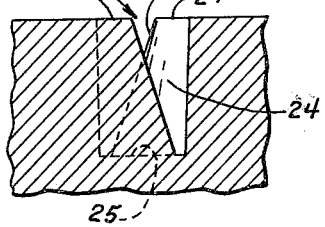
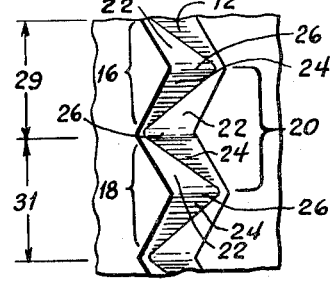
INVENTOR.
BRUCE D. CAULKINS
BY
ATTORNEY.

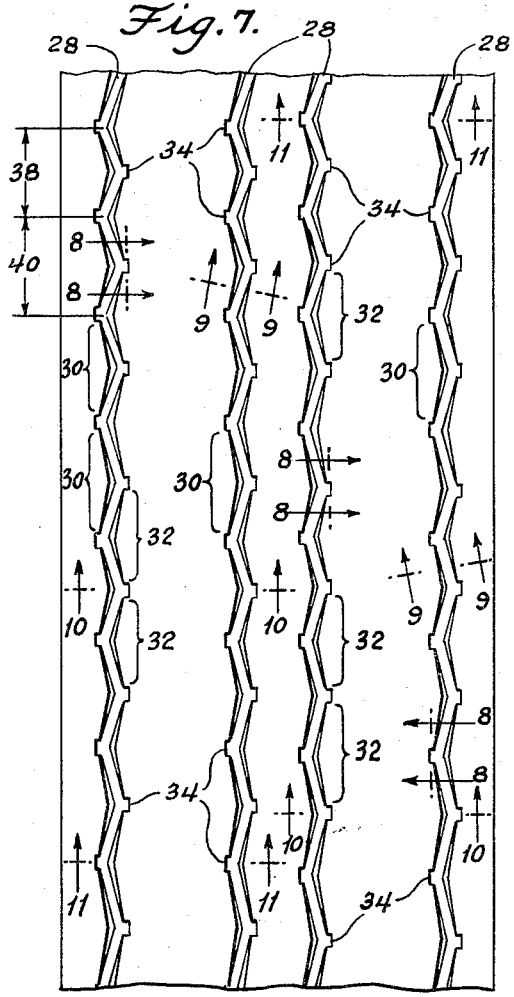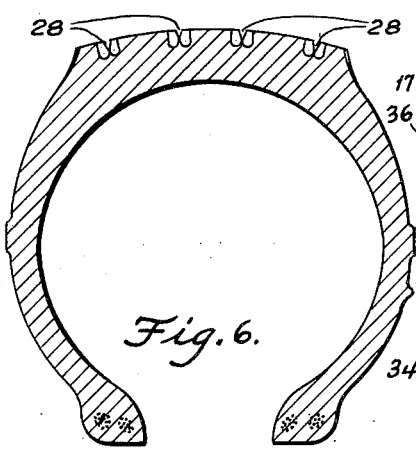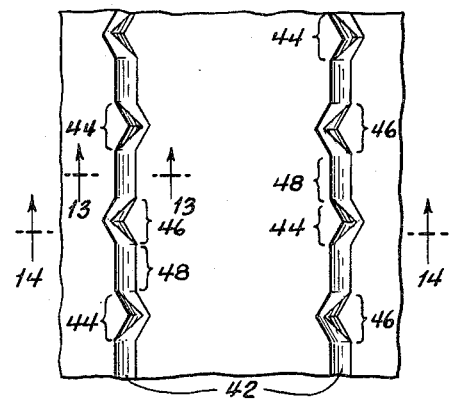

United States Patent Office 3,055,410
Patented Sept. 25, 1962

3,055,410
TIRES
Bruce D. Caulkins, Mountainside, N.J., assignor to Atlas Supply Company, Newark, N.J., a corporation of New Jersey
Filed Jan. 29, 1960, Ser. No. 5,480
10 Claims. (Cl. 152—209)

This invention relates generally to pneumatic tires as used by the variety of vehicles on our highways today and has particular relation to an improved tread of such a tire.

It is found that tire treads that are provided with a number of laterally spaced circumferentially extending grooves in the periphery, effectively separating the tread periphery into laterally spaced portions are long wearing and have excellent traction properties. While such tread design has demonstrated excellent non-skid and long wearing properties cracks have been produced at the base of the grooves resulting from the concentration of forces at the groove base which eventually cause this cracking because of compression fatigue. Furthermore, these grooves have produced a tendency to retain relatively small stones within them which may eventually damage the tire and which also create a hazard since they are likely to be thrown from the tire at high speeds. These difficulties are overcome with the present invention.

Accordingly, it is an object of this invention to provide an improved tread organization for a tire.

Still another object of the invention is to provide such a tread organization having circumferentially extending grooves which are constructed in a manner so as to prevent or reduce the possibility of cracking of the tread stock at the base of the groove due to compression fatigue.

A still further object of the invention is to provide such an improved tread organization wherein the grooves are constructed so as to tend to inhibit or prevent the retention of stones in the grooves.

Still another object is to provide such an improved tread organization which is quiet in operation and wherein the groove design offers non-skid properties with the design being such as to offset the effect of wear in this regard as the thickness of the tread progressively decreases.

Still further and more detailed objects of the invention will in part be obvious and in part be pointed out as the description of the invention, taken in conjunction with the accompanying drawing, proceeds.

In that drawing:

FIG. 1 is a fragmentary perspective view of a tire which is provided with a tread construced in accordance with one preferred embodiment of the invention;

FIG. 2 is an enlarged fragmentary elevational view showing in more detail the tread construction of the tire of FIGURE 1;

FIG. 3 is a sectional view taken generally along line 3—3 of FIGURE 2 illustrating in detail how the circumferential groove in the tread is formed;

FIG. 4 is a similar sectional view taken along line 4—4 of FIGURE 2;

FIG. 5 is a fragmentary elevational view showing a small portion of one of the circumferential grooves in the tire tread of FIGURES 1 and 2 and providing a detailed illustration of the construction of the groove;

FIG. 6 is a transverse sectional view of a tire having a modified tread construction;

FIG. 7 is a fragmentary elevational view of the tread construction of the embodiment of FIGURE 6;

FIG. 8 is a sectional view of an offset recess that forms part of the groove construction in the embodiment of FIGURE 7 with this FIGURE 8 illustration being taken along line 8—8 of FIGURE 7;

FIG. 9 is a transverse sectional view through one of the grooves of the embodiment of FIGURE 7 with this view being taken along line 9—9 of FIGURE 7;

FIG. 10 is a transverse sectional view taken along line 10—10 of FIGURE 7;

FIG. 11 is a fragmentary sectional view taken along line 11—11 of FIGURE 7;

FIG. 12 is an elevational view of a further modified tread construction;

FIG. 13 is a sectional view through one of the grooves of the FIGURE 12 embodiment and is taken along line 13—13 of FIGURE 12; and FIG. 14 is a sectional view taken along line 14—14 of FIGURE 12.

Considering now the improved tread construction as illustratively depicted in the drawing and considering first the embodiment of the invention set out in FIGURES 1 through 5 there is disclosed therein a tire designated generally 10, which, as is conventional, includes a carcass to which is secured the tread of the tire. The tire is made of any of the materials which are commonly employed in the manufacture of tires today, such as natural or synthetic rubber compositions, and the tire is formed in accordance with usual practice wherein the carcass is built up of a series of layers of tire material having imbedded therein a suitable textile cord, such as rayon or nylon, and the tread stock is then provided over these built up layers. This composite structure is formed and cured in a mold being expanded into the mold by an expansible bag and being heated to a predetermined temperature for a predetermined time. It is in this mold that the design is imparted to the periphery of the tread. In the FIGURES 1-5 embodiment this peripheral design includes the two grooves 12 which are uninterrupted or continuous and extend circumferentially about the tread. These grooves are spaced somewhat inwardly of the lateral extremities of the road-engaging peripheral portion of the tread, as shown, and are laterally spaced. The tread portion located between the grooves 12 is provided with a number of irregularly shaped narrow slits 14 so as to give this tread portion greater flexibility and better traction or antiskid properties. The depth of the grooves 12 and of slits 14 is generally the same.

Each of the grooves 12 is constructed so as to be alternately buttressed from opposite sides and from within the groove. Each of the grooves is also constructed so as to be flared outwardly from its base or root at a substantial angle toward its outer extremity.

The buttress construction or configuration of each of the grooves 12 is shown in detail in FIGURE 5 with three full buttresses being shown therein and identified as 16, 18 and 20, and with buttresses 16 and 18 extending from and forming part of the left wall of the groove shown in this illustration and buttress 20 extending from and forming part of the right wall. It will be understood that this buttress configuration is continuously repeated throughout the circumferential length of the circumferential length of the groove. Each of the buttresses is comprised of a pair of angularly disposed faces 22 and 24 which terminate in a rounded apex 26. The buttresses are thus triangular in transverse configuration and extend outwardly from their respective sides of the groove toward the opposite side terminating in spaced relation from the opposite side. Each of the buttresses has a greater cross-section at its base 25 (FIGS. 3 and 4) than at its top 27 with the cross-section progressively decreasing from the base toward the top. This causes the base of each of the buttresses to extend closer to the opposite wall than the upper end of the buttresses and since the buttresses on each wall are in immediate adjacent relation the resulting groove has a relatively sharp zig-zag configuration at the root or base thereof with this zig-zag configuration becoming progressively less pronounced towards the outer extremity of the groove. It is preferred that this outer extremity also have a zig-zag configuration in order to provide better traction or anti-skid properties although it may be such that the outermost portion of the groove is straight rather than being in zig-zag form.

The resulting groove also tapers sharply outward from its inner extremity as clearly evidenced in FIGS. 3, 4 and 5, and the depth of the groove is substantially greater than the width thereof at the outer extremity of the groove with this width in turn being substantially greater than the corresponding dimension or width at the base of the groove. Illustrative of these groove dimensions; the groove depth may be .725 inch while the width at the outer extremity may be .345 inch and the width at the inner extremity may be .135 inch.

With this groove organization of FIGURES 1–5, the alternate buttressing of the opposite walls of the grooves distributes the forces at the base of the grooves so as to greatly reduce the possibility of compression fatigue of the tread at this location and accordingly reducing the possibility of cracks developing from this cause. These buttresses provide additional strength where it is necessary in order to prevent cracking of the tread stock and also provide a groove that has a wide outwardly flaring angle to eliminate or greatly reduce the possibility of the retention of stones or other foreign material in the groove. This design has the further beneficial characteristic of having a more pronounced zig-zag as the tread wears. This has the effect of maintaining the anti-skid or high traction properties of the tread as the tread wears and its thickness becomes progressively less.

In order to prevent the build-up of harmonics and provide a quieter operating tread, adjacent buttresses such as 16 and 18 in FIGURE 5 preferably have different circumferential lengths or to put it another way the pitch of adjacent buttresses is different, with the dimensions 29 and 31 being different. This will vary the frequency of the sound that is developed by the tread and reduce the over-all sound level produced.

The embodiment of FIGURES 6–9 is somewhat similar to that of FIGURES 1–5 in that the grooves 28 that are provided in the embodiment are alternately buttressed from within with there being four grooves as disclosed. In the FIGURE 7 illustration the buttresses on the left side of the groove are identified as 30 while those on the right side of the groove are identified as 32. These buttresses are constructed in the same manner as those in the FIGURES 1–5 embodiment so that the base of the grooves 28 are of a relatively sharp zig-zag configuration with this configuration becoming progressively less pronounced from the base of the grooves outward. The modified embodiment of FIGURES 6–9 differs from the previously described embodiment in that rather than having the buttresses on each wall of the grooves being in immediate adjacent relation these buttresses are separated by a laterally extending recess identified as 34 which is generally normal to the outer surface or periphery of the tread and is of the configuration shown in FIGURE 8. To illustrate the particular angular disposition of the groove walls at the location of this recess, wall 36, identified in FIGURE 10, may be at an angle of 17 degrees with a line normal to the surface of the tread while the wall of recess 34 may be inclined in the same direction as wall 36 with the inclination of the wall of recess 34 being 4 degrees. This tread or groove configuration of the FIGURES 6–9 embodiment provides, by means of recesses 34, an additional irregular groove pattern over that of the FIGURES 1–5 embodiment and provides excellent anti-skid properties as well as resisting cracking at the base of the grooves.

Here also in order to reduce the noise level developed by the tread adjacent buttresses preferably have different circumferential lengths, as for example the circumferential length identified as 38 is different than the circumferential length identified as 40 in the FIGURE 7 illustration.

Accordingly, this modified construction as well as that of FIGURES 1–5 provides a groove that flares sharply outward to prevent stone retention, distributes the forces at the base of the groove and produces high traction.

The embodiment of FIGURES 12, 13 and 14 is somewhat similar to that of the two previously described embodiments in that the walls of the grooves 42 are alternately buttressed from within, although in the FIGURES 12, 13 and 14 embodiment the buttresses on the opposite walls as well as the buttresses on the same wall are substantially spaced so that in effect an unbuttressed groove portion interconnects spaced buttressed groove portions. In this FIGURE 12, 13 and 14 embodiment the buttresses on the left side of the grooves are identified as 44 while those on the right side are identified as 46 with the interconnecting unbuttressed groove portions being identified as 48. These buttresses are constructed in the same manner as those of FIGURES 1–5 so that the zig-zag at the inner extremity of the groove produced by the buttresses is more pronounced than at the outer extremity and progressively decreases from the inner toward the outer extremity. In this FIGURE 12, 13 and 14 embodiment the zig-zag portions of the groove are interconnected with straight portions which are of the configuration shown in FIGURE 13 having a relatively sharp outward taper to prevent stone retention within the groove. As in the case of the previously described embodiment this embodiment of the invention is effective to greatly reduce the possibility of cracking due to compression fatigue as well as providing anti-skid and anti-stone retention properties and with the zig-zag configuration becoming progressively more pronounced as the tread wears.

In this modified embodiment the buttresses as well as the interconnecting straight groove portions 48, which are adjacent each other, may be of different circumferential length in order to provide a relatively low noise level that is produced by the tread in operation.

Since certain changes may be made in the above product and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A tire, having a tread provided on its outer surface with a circumferential groove having opposite sides alternately buttressed by alternately arranged buttresses in the groove, said buttresses extending throughout substantially the full depth of the groove and said buttresses having a substantial thickness throughout their height and having a larger cross-section at the base than at the top.

2. The organization of claim 1 wherein the buttresses have a triangular transverse configuration, 3. The organization of claim 2 wherein the apex of the buttress base is substantially closer to the opposite wall than the top of the buttress.

4. In a tire tread, a circumferentially extending groove, alternately arranged integral buttresses alternately extending into said groove from the opposite sides of said groove and extending throughout the depth of the groove, each of said buttresses including a base portion integral with the bottom of said groove and having a materially greater cross-section than the top of said buttress, the laterally outermost portion of said base being located closely adjacent to but spaced from the opposite wall of said groove, and the top of said buttress being spaced a substantially greater distance from said opposite wall of said groove than the base of said buttress.

5. A composition rubber tire tread provided with a plurality of circumferentially extending zig-zag grooves therein that taper generally radially outwardly for substantially the full height of the groove, the zig-zag extending throughout the height of the groove being much more pronounced at the root of the groove than at the outer extremity thereof thereby effectively forming a plurality of alternately disposed buttresses on opposite sides of the groove providing for increase in the zig-zag of the groove as the tread wears.

6. A composition rubber tire tread provided with a plurality of circumferentially extending zig-zag grooves therein with each groove having a depth much greater than the groove width at the outer extremity thereof and with said groove width at said outer extremity being much greater than the groove width at the inner extremity of said groove, the zig-zag extending throughout the depth of the groove and, at the root of the groove, being much more pronounced than at the outer extremity thereof thereby effectively forming a plurality of alternately disposed buttresses on opposite sides of the groove which increase in cross sectional area as the tire wears and which reinforce the base of the grooves against longitudinal cracking 7. In a tire, a tread surface formed with a plurality of circumferential grooves therein having a zig zag formation, said zig zag formation being formed by alternating pairs of buttresses, and receiving recesses therefor forming opposite side walls of said grooves, said buttresses and recesses being subtantially triangular in cross section and extending throughout substantially the full height of the walls of said grooves, the bases of said buttresses extending across the bottoms of said grooves to a position closely adjacent the opposite side wall of said groove and being integral with said bottoms to reinforce the same against longitudinal cracking, and the apices of buttresses inclining away from said opposite side wall throughout their extent from said bases outwardly of said grooves whereby the zig zag of said grooves increases as said tire wears.

8. In a tire, an anti-skid tread having a plurality of laterally spaced circumferentially extending grooves, each of said grooves having buttresses formed on the side walls thereof as integral parts of the side walls with the buttresses on opposite walls being alternately disposed and having a generally triangular transverse section, the walls opposite said buttresses being recessed to receive the same, the dimension of the buttresses transversely of the groove being progressively greater radially inward of the tire from the peripheral extremities thereof to the bases thereof, the circumferential extent of adjacent buttresses being different to reduce the noise produced by the tread design during operation.

9. In a tire, an anti-skid tread having a plurality of laterally spaced circumferentially extending grooves, each of said grooves having buttresses formed on the side walls thereof as integral parts of the side walls with the buttresses on opposite walls being alternately disposed and having a generally triangular transverse section, the walls opposite said buttresses being recessed to receive the same, the dimension of the buttresses transversely of the groove being progressively greater radially inward of the tire from the peripheral extremities thereof to the bases thereof, the buttresses on each wall of each groove being separated by a recess provided in the groove wall.

10. In a tire, an anti-skid tread having a plurality of laterally spaced circumferentially extending grooves, each of said grooves having buttresses formed on the side walls thereof as integral parts of the side walls with the buttresses on opposite walls being alternately disposed and having a generally triangular transverse section, the walls opposite said buttresses being recessed to receive the same, the dimension of the buttresses transversely of the groove being progressively greater radially inward of the tire from the peripheral extremities thereof to the bases thereof, the buttresses on each wall of each groove being separated by a recess provided in the groove wall, said recesses extending to the base of the groove and having a dimension circumferentially of the tire that is substantially smaller than the corresponding dimension of the buttress and the apex of the alternately arranged buttresses are opposite one of these recesses.

References Cited in the file of this patent

UNITED STATES PATENTS

| | | |
|---|---|---|
| 2,661,041 | Walsh | Dec. 1, 1953 |
| 2,701,598 | Gray | Feb. 8, 1955 |
| 2,779,378 | Robertson | Jan. 29, 1957 |
| 2,819,751 | Frary et al. | Jan. 14, 1958 |
| 2,850,066 | Nellen | Sept. 2, 1958 |
| 2,869,609 | Billingsley et al. | Jan. 29, 1959 |